United States Patent [19]

Wilkins

[11] Patent Number: 4,848,004
[45] Date of Patent: Jul. 18, 1989

[54] COORDINATE MEASURING MACHINE

[76] Inventor: Larry C. Wilkins, 1601 Hedden Ct., New Albany, Ind. 47150

[21] Appl. No.: 136,356

[22] Filed: Dec. 22, 1987

[51] Int. Cl.⁴ .............................................. G01B 7/14
[52] U.S. Cl. ..................................... 33/503; 33/1 M; 33/644
[58] Field of Search .......................... 33/644, 503, 1 M

[56] References Cited

U.S. PATENT DOCUMENTS

| | | |
|---|---|---|
| 2,735,186 | 2/1956 | Boppel . |
| 2,801,473 | 8/1957 | Kirk . |
| 3,165,834 | 1/1965 | Benton ............................. 33/503 X |
| 3,425,134 | 2/1969 | Christensen ..................... 33/503 X |
| 3,624,913 | 12/1971 | Ciampolini . |
| 3,726,018 | 4/1973 | Brenneisen . |
| 3,918,167 | 11/1975 | Gerber ............................. 33/503 X |
| 3,990,153 | 11/1976 | Calame ............................ 33/503 X |
| 4,525,931 | 7/1985 | Wilkins . |

OTHER PUBLICATIONS

Fowler the Ultra-Digit Computer System Literature; pp. 211-214, Tychoway Bearings Company, "Tychoway Linear Slides and Components" literature.

Primary Examiner—William D. Martin, Jr.
Attorney, Agent, or Firm—Woodard, Emhardt, Naughton, Moriarty & McNett

[57] ABSTRACT

To measure in X-axis, Y-axis and Z-axis coordinates, modules including indicator gages, guides, small linear slides, adjustable stops, and a pneumatic actuator for at least one axis, are bolted together in a manner such as to be readily mounted to a table or other fixture for measuring locations of features on workpieces. The parts are provided with symmetrical arrangements of holes to facilitate reversal of mountings to adapt to a variety of installations without modification of the parts themselves.

13 Claims, 2 Drawing Sheets

COORDINATE MEASURING MACHINE

BACKGROUND OF THE INVENTION

1. Field of the Invention

This invention relates generally to gaging of physical dimensions of manufactured products, and more particularly to a gage assembly mountable to a fixture or machine and used in a production situation where parts are placed in front of the gage and, when the gage is activated, the gage will indicate the coordinate locations of selected features on a part.

2. Description of the Prior Art

The gaging art is highly developed and has become very sophisticated in view of requirements for obtaining and maintaining precise dimensions and close tolerances in some manufactured products. But there are situations where the expense that is sometimes incurred in the use of highly sophisticated gaging techniques, cannot be justified, either due to the relatively large tolerances that can be accepted, the relatively low cost of scrap, or for other reasons. On the other hand, simple "go" or "no-go" gaging is not necessarily acceptable because operators can have no way to detect a trend of dimension between a "go" and "no-go" situation, and have no useful input for application of statistical process control techanques* to the manufacturing operation. Therefore, there has remained a need for relatively inexpensive gaging readily adaptable to measurement of a variety of dimensions within reasonably close tolerances and providing output to remote monitors and dataprocessing equipment. My U.S. Pat. No. 4,525,931, issued July 2, 1985 illustrates the use of a dial indicator gage assembly for measurement of parts and wherein the dial indicator gage itself is protected from damage upon application of the gage to the part or workpiece. That same technique is applicable to indicator gages which have a digital display on them and a useful output to electronic data-processing equipment. An example is "The Fowler Ultra Digit" electronic indicator made in England and which can produce an output through a suitable interface such as a "GageTalker" interface device to a suitable computer and associated printer such as a Radio Shack PC-2 computer/printer, for example. The present invention is a further advance in gaging.

SUMMARY OF THE INVENTION

Described briefly, according to a typical embodiment of the present invention, a gage assembly is provided with a base to be fastened to a fixture to work workpieces are to be brought for gaging. At least one linear slide assembly is mounted to the base, and a gage is mounted to the base. A gage actuator is operably associated with the movable element of the slide assembly, to provide a gage response to the position of the movable element. A part-engagable probe is also associated with the moveable element of the slide so that position of the part relative to some reference, can be detected and indicated by the gage. The components are provided in modular form, so two additional axes and associated gages and slides can be employed. A controlled-pressure pneumatic actuating cylinder is provided to move the probe into contact with the workpiece. When the measurement is done, the pneumatic pressure is removed from the cylinder and the probe is retracted.

DESCRIPTION OF THE PREFERRED EMBODIMENT

Figure 1:
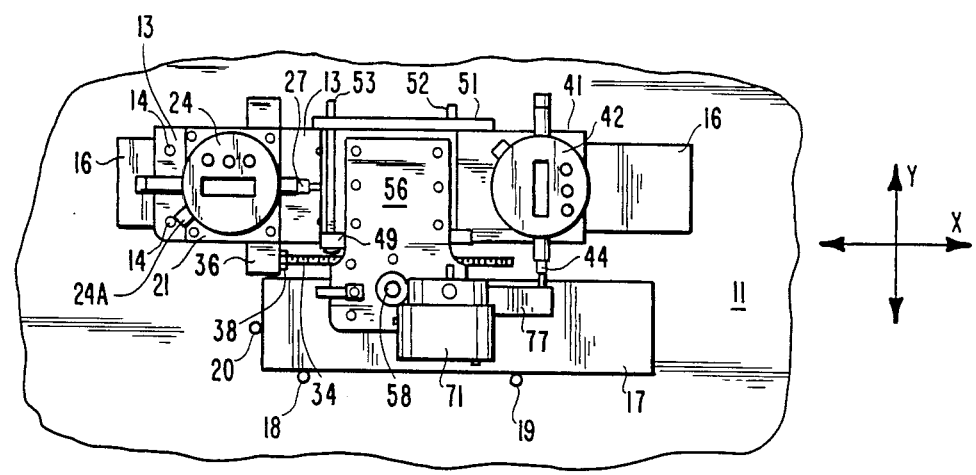
FIG. 1 is a top plan view of a gage assembly according to a typical embodiment of the present invention.
Figure 2:
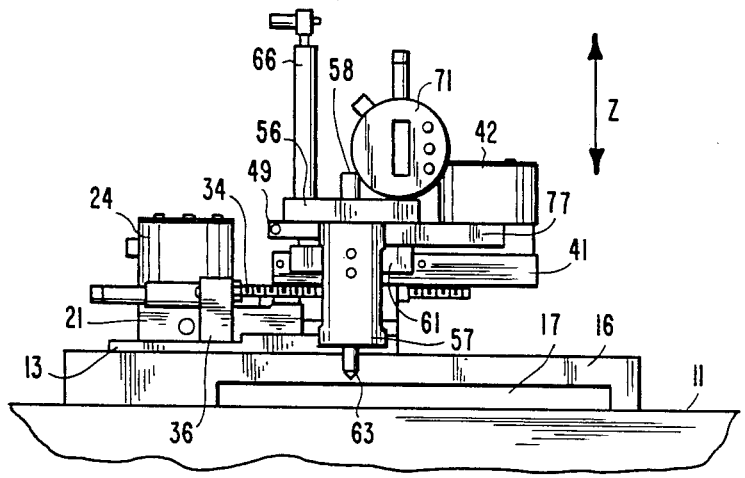
FIG. 2 is a front elevational view.
Figure 3:
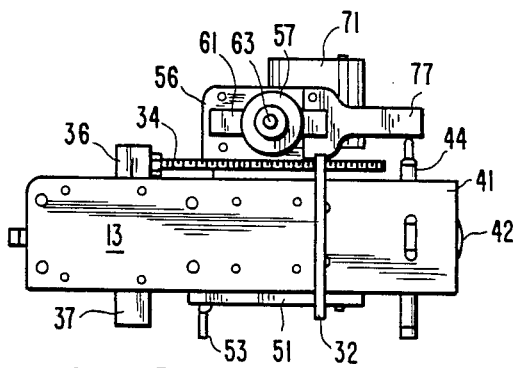
FIG. 3 is a bottom plan view thereof.

Referring now to the drawings, FIG. 1 shows a table top 11 on which the gage assembly 12 is secured by bolting the gage base 13 by means of bolts as at 14, for example, to a mounting rail or fixture 16 which is bolted or otherwise attached to the table top 11. A workpiece 17, for example, in which a hole location is to be checked, for example, can be clamped to the table 11 for measuring the location of a hole by positioning the plate against reference locators 18, 19 and 20, for example. A first indicator mount 21 is bolted to the base 13. It has a slot 22 (FIG. 4) receiving a tongue 23 of the indicator gage 24, which is fixed in the mount 21 by the set screw 26. The gage 24 can be a Fowler gage of the type mentioned above. The gage operating plunger 27 extends to the right in FIGS. 1, 2 and 4, which is along the X-axis of the gage.

Linear slide assemblies of a type which can be purchased finished, are used according to this invention. Each of these has two outer attachment units by which they can be attached to other devices. The lower attachment unit is sometimes referred to in the manufacturer's literature as the "base", and the upper attachment unit is sometimes referred to in the literature as the "positioning table." To avoid confusion in the description herein, the terms "base" and "positioning table" will not be used to refer to the slide assemblies.

More specifically, as applied in accord with the present invention, a first linear slide assembly 28 has bottom unit 29 bolted to the base 13. The top unit 31 of the slide assembly 28 is linearly movable in the X-axis direction, being mounted to the bottom unit by anti-friction bearings. Anti-friction bearings are distinguished in the respect that they use following means rather than sliding contact between the load bearing components. For the linear slide assemblies used in the practice of the present invention, they used the crossed roller bearing arrangement as marketed by Tychoway* Bearings Company, of Charlotte, N.C. These slide assemblies are constructed with precision so that the user can depend on the top and bottom surfaces of the top and bottom units. Respectively, to be parallel and flat.

A travel limit plate 32 is fastened by screws (one shown in FIG. 7) to the end of the upper unit 31 of the linear slide. It has an aperture 33 therein which receives freely through it a threaded stop rod 34 which is mounted in a stop mount 36 which is fastened by screws (one shown) to the front of the indicator mount 21. A similar stop mount 37 is fastened to the rear of the indicator mount 21. And can likewise be used with a stop rod, if desired. The rod 34, which may be a slotted head bolt, for example, may be screwed into the mount 36 until the head on the rod abuts the mount to fix the rod tight in the mount. A jam nut 38 can be employed to further lock the rod in the mount, if desired, but this is not necessary unless the hole in the mount is unthreaded, in which case the nut is jammed against the stop mount 36 and fixes the rod in the mount. The particular location of the stops is determined by other nuts such as 38 but with locking inserts and threaded on the rod at opposite sides of the limit plate 32. Appropriate adjustments are made to avoid exceeding the operation limits of the indicator plunger 27.

An upper gage and slide mount 41 is bolted to the upper unit 31 of the linear slide assembly 28. A second gage 42 is fastened to this mount by the set screw 43 in the same manner as gage 24 was secured to the mount 21 except that, in this instance, the gage plunger is oriented in the Y-axis direction.

A second linear slide assembly 46 has a lower unit 47 bolted to the mount 41, and an upper unit 48 linearly slidable thereon in the Y-axis direction. This linear slide is identical to slide 28. A limit plate 49 is fastened by a pair of screws (one shown) to the front end of this upper unit 48. A limit support 51 is bolted by screws 52 to the back end 47R of the lower unit 47 of linear slide 46. The eY-axis limit rod 53 (shown a bit shorter than it would normally be made, to conserve space in the drawing) is affixed to this limit support 51 by screwing it into the threaded hole in the support and fixing it with a jamb nut or other suitable means. A coil compression spring and a sleeve are shown on the axis of rod 53 for a purpose which will be described hereinafter. The hole 54 in the limit plate 49 is large enough for the rod to pass freely through it. The mounting of locking insert nuts to the rod 53 is used as with rod 34 whereby appropriately located nuts thereon cooperate with the limit plate 49 to set the travel limits of the Y-axis slide.

A probe plate 56 is bolted to the top of the upper unit 48 of linear slide 46. It is cantilevered out beyond the front of the linear slide. A cylindrical probe housing 57 is bolted to the bottom of the probe plate 56 and serves as a guide for the probe shaft 58 which is vertically mounted and guidedly slidable vertically therein. This housing has a transverse slot 59 through it and through which a driver bar 61 extends. Set screws 62 fix the vertical location of the probe shaft 58 in the driver bar, with the probe tip 63 extending down from the bottom of the probe shaft and below the bottom 64 of the probe housing. This probe tip is the workpiece contacting anvil in this embodiment of this invention, and is vertically movable for purposes which will become apparent. A pneumatic cylinder 66 has its lower end received in a counterbore in the probe plate 56, with a threaded portion at the lower end of the cylinder screwed into threads in the probe plate 56, with a threaded portion at the lower end of the cylinder screwed into threads in the probe plate 56 under the counterbore. The piston rod 67 is screwed into the driver bar 61 and locked therein by the nut 68 jammed against the driver bar. The piston rod is normally retracted by a spring in the cylinder 66.

A third gage 71 has its plunger guide collar 72 received in a split sleeve which fits in a counterbore in the probe plate 56 and is secured therein by a set screw threadedly received in the side of the probe plate. The plunger 73 extends downward therefrom with the plunger tip 74 engaging the top of the driver bar at 76. The plunger 73 is in the Z-axis orientation. The X, Y, and Z axes are perpendicular to each other. For actuation of the Y-axis plunger 44, an indicator driver bar 77 is bolted to the bottom of the probe plate 56 outboard of the probe housing 57 which is accommodated in the cylindrical notch 78 in the driver 76. The rear face 79 of this driver is engaged by the tip 44T of the plunger 44 of Y-axis gage 42. So it is seen that the X-axis and Y-axis gaging is provided for by the stacking of two conventional crossed roller bearing linear slide assemblies in vertical projection or alignment, with their operational axes in perpendicular planes which intersect each other along the X and Y axes.

Operation

As an example of one use of the gage of the present invention, it can be used to find the location of a vertical hole in the workpiece or plate 17. For that purpose, the probe may be positioned first at a hole in a master gage mounted on the table, and the gages zeroed, and the stop limits established so that the probe will not be able to move away from the center of the hole a distance greater than the radius of the hole. Then the master gage is removed, and the plate 17 is positioned against the locators 18, 19 and 20 fixed in the table top, to establish a reference for the X and Y coordinates of the hole. Then the probe tip 73, which typically has a 90° included angle cone, is moved down into the hole by application of pneumatic pressure in the cylinder 66. As the surface of the cone engages the edge of the hole, the resulting side force against the cone, unless it is perfectly centered at the center of the hole, will move the probe horizontally until it centers itself in the hole. When this occurs, each of the indicators 24 and 42 will signal in their respective windows, a reading which represents the and Y coordinates, respectively, of the location of the hole with reference to the zero, the zero being known with reference to the center established by the intersection of a line tangent the locators 18 and 19, and a second line perpendicular thereto and tangent locator 10.

In the use of the invention in this way, and which may be understood from the foregoing description, it is important to note that the stops on the rods 34 and 53 must be adjusted such that when the part is placed against the locators and clamped to the table, the center of the probe tip cone is no farther from the center of the hole than the radius of the hole. If it is farther than that, it will not enter the hole but rather will strike the top of the workpiece and the either damage the tip or the workpiece, or both, depending upon the fluid application pressure in the pneumatic cylinder 66.

After the measurement is made, the pressure is removed from the pneumatic cylinder, whereupon the built-in spring return of the piston rod pulls the probe tip out of the hole, whereupon the workpiece can be removed.

As mentioned above, the particular type of indicators used have a visible signal output in the form of a digital readout on the window shown in the various figures of drawing. In addition, they have a an electric signal output terminal as at 24A in FIG. 1 for gage 24, which can be connected to an electronic interface to a computer so the data can be entered into a computer.

In addition to measuring a hole position as described above, the indicator 71 is useful to determine the hole depth. This indicator can be zeroed by placing the tip against a gage referencing the top of the plate, or the desired location for the top of the plate. Then, as the probe descends from that elevation while it enters the hole, the gage reading changes accordingly to provide a direct readout of the hole depth with reference either to the top of the plate itself, or to a desired reference at which the indicator is set to zero.

Figure 4:
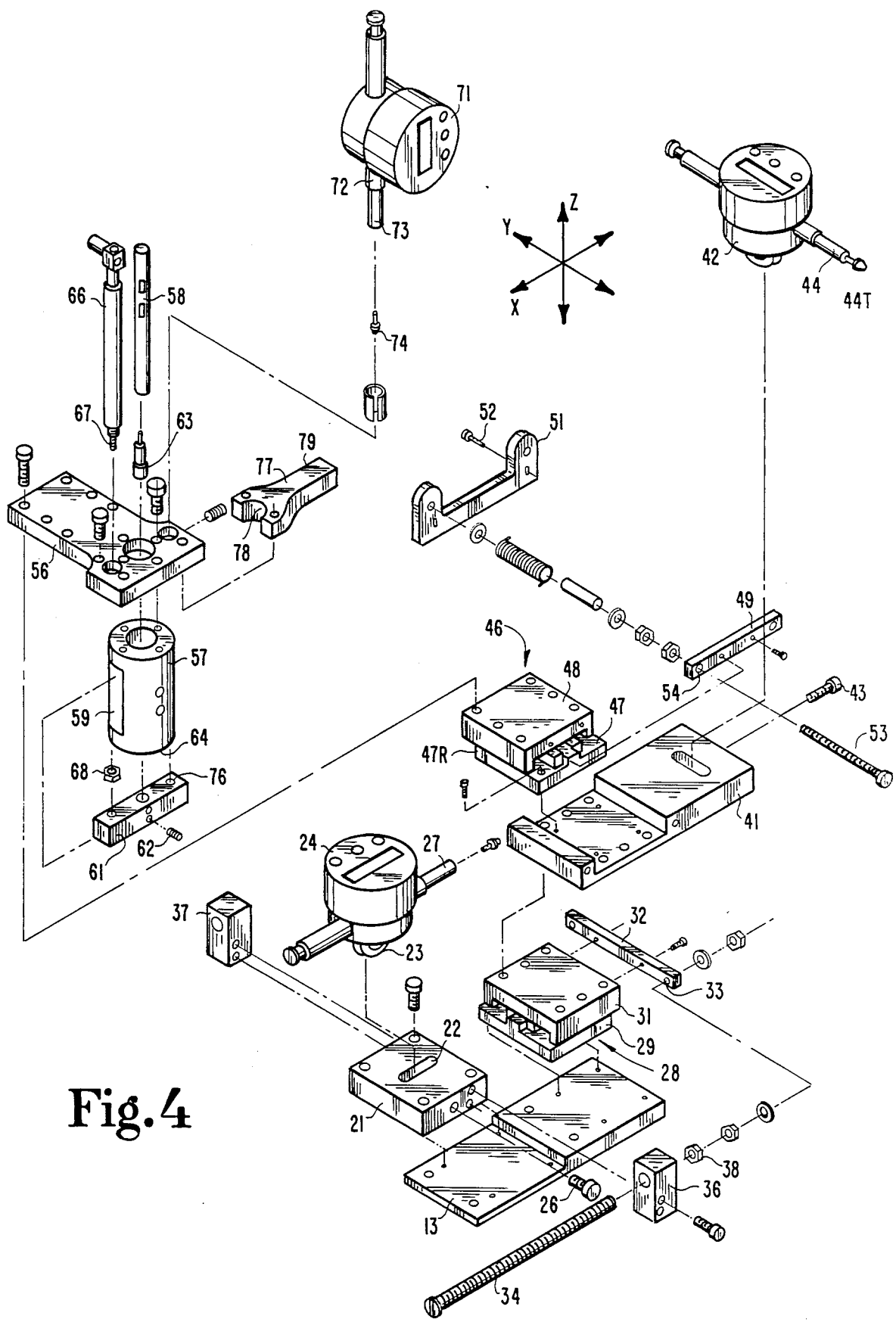
FIG. 4 is a exploded pictorial view thereof.

The measuring machine of the present invention can be used readily for other purposes than identifying the position of a single hole on a plate. For example, in addition to the Z-axis actuation by the pneumatic cylinder, pneumatic cylinders can be added to the X-axis and the Y-axis. As may be readily apparent in FIG. 4, the stop rod 34 can be screwed into the mount 36 and fixed in position by the nut 38. The rod passes freely through the hole 33 in the limit plate 32 which is secured to the upper part 31 of the linear slide 28. Two additional nuts are shown in FIG. 4, one on each side of the limit plate 32. These are of the type mentioned above as having a locking insert. It can be a plastic insert so that their position on the stop rod will remain constant due to the high relative friction between the elastic and the rod. The washers between the nuts and the stop rod are simply soft material to provide a cushioned stop if the limit bar is moved to the point of abutment with either of the stop nuts on the rod 34. They can be fabric, rubber, or O-rings.

It should also be noted that there is an additional mount 37 like mount 36 but at the opposite face of the indicator mount 21. The mount can serve as the mount for a pneumatic cylinder like cylinder 66 which can be screwed into the mount and have a piston rod received in the aperture in the limit plate 32 at the end opposite that at which aperture 33 is located. The piston rod can be screwed into the limit plate or can be a slip fit and anchored by jam nuts on both faces of the limit plate so that the piston rod can serve to actuate the upper part 33 of the X-axis slide 28 to move the probe housing and thereby the probe back and forth in the x-axis direction within whatever limits are established by the stop nuts on the stop rod 34.

The stop rod 53 can be constructed like the rod 34, as can a rod located at 52 (FIG. 1). On the other hand, if it is desired to provide Y-axis powered actuation of the probe, a pneumatic cylinder can be mounted at the location of either of the rods 52 or 53, with the other location being used for a stop rod. Thus, Y-axis actuation can be provided within whatever limits are provided by the combination of the stops on the rod and the limit plate 49. In the FIG. 4 version of the stop rod 53, it passes freely through the aperture 54 in the limit plate 49 and is threaded into the limit support 51. Stop nuts, cushion washers, and a coil spring can be used on this combination, if desired. The spring is illustrated here to indicate a way in which the gage assembly can be made useful even if the plate 13 is mounted in a vertical plane instead of the horizontal plane as shown herein. If so mounted, the probe axis would be on a horizontal plane. Even though it is small, the probe plate and the components mounted to it are heavy enough that they should be balanced. Therefore, if the orientation is such that the mount 51 is below the limit plate 49, the spring can be selected so that the spring will balance that weight, and the movement of the probe in the direction of the (then) vertical axis of the slide assembly 46 will be influenced primarily by the centering of the probe in a hole. Similarly, if the movements of the slides are powered, the arrangement using the spring will make it much easier to obtain responsive movement unaffected by the weight of the probe assembly and mount for it. Thus it will be apparent that the machine of the present invention is readily adaptable to applying power to the X and Y-axis slides for movement of the probe to various positions on those coordinates.

Linear slide assemblies as used in the present invention can be purchased "off-the-shelf" in various sizes. For the purposes of the present invention, it is preferable that they have a maximum size of about 200 millimeters in length. But the optimum for most hole location applications is the Tycoway* No. NK 3-55 linear slide assembly which has an overall length of 55 mm., a width of 50 mm. and a travel of 30 mm. These are substantially square as can be seen in the drawings herein. The indicator gages have cylindrical housings of substantially the same diameter as the slide width. Thus, small linear slide assemblies are very useful in the practice of the present invention. Accordingly, whereas the prior art machines known to me for coordinate measuring, typically employ relatively large, specially fabricated parts, often involving a bridge structure over the workpiece to be checked, the present invention enables construction of very accurate and relative inexpensive gaging machines using very small components that are standard "off-the-shelf" components to build them. It was mentioned above that the probe mount has counterbores receiving the gage mounting split sleeve and the pneumatic cylinder. These are the same size, so there is interchangability of the location of the gage and the cylinder. Also, it will be noted that there is symmetry in locations of holes for screws and bolts in the slide mounts, lower and upper components of the slide assemblies, limit supports, limit plates, probe plate, indicator driver, stop mount driver bar and probe housing. This makes possible a great variety of possible combinations of these components, and subassemblies thereof for use as modules in construction of gaging machines for various purposes. For example, using lower mount 13, indicator mount 21, gage 24, linear slide 28, with an anvil fixed on the top unit of the slide, a pneumatic cylinder can be screwed into mount 37, the piston rod thereof screwed into the limit plate 32 and thus create a single-axis fixed-anvil gage assembly. In this instance, the anvil would be fixed in the sense that it cannot move in any axis other than that of the movement of the slide assembly. By taking the anvil off top unit 31 of the slide assembly, fastening upper mount 41 to the top unit 31, fastening gage 42 to upper mount 41, fastening slide assembly. By taking the anvil off top unit 31 of the slide assembly, fastening upper mount 41 to the top unit 31, fastening gage 42 to upper mount 41, fastening slide assembly 46 to the upper mount, fastening probe plate 56 to the top unit 48 of the upper slide assembly, and fastening the anvil to the probe plate, one has a two-axis, fixed-anvil gage assembly. Thus, the present invention uses stacking of the linear slides to provide the X-axis and Y-axis capability were two axis gaging is needed.

Using only the assembly of parts 56 through 79, one has a single-axis, movable-anvil gage assembly.

As indicated above, the nature of the construction and arrangement of the parts, particularly the symmetry in shapes and hole arrangements according to the present invention, adapts them to power actuation of the anvil member in all three axes, and adaptation to left-hand and right-hand embodiments of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A gage assembly to be mounted on a fixture to which workpieces to be measured can be fastened while measurements are made in mutually perpendicular X-axis, Y-axis and Z-axis coordinates, the assembly comprising:
- a base mountable to the fixture;
- a first gage secured to said base and having a gage-operating plunger extending in the X-axis direction;
- a first two-component linear side assembly having one component fixed to aid base and the other component thereof for precise linear movement of said other component in the X-axis direction;
- a second gage secured to said other component of said first linear slide assembly and having a gage-operating plunger extending in the Y-axis direction;
- a second two-component linear slide assembly having one component secured to the other component of the said first slide assembly, the other component of said second slide assembly being anti-friction bearing mounted to said one component thereof for precise linear movement of said other component thereof in the Y-axis direction;
- a third gage secured to said other component of said second slide assembly and having a gage-operating plunger extending in the Z-axis direction;
- a Z-axis probe guide secured to said other component of said second slide assembly;
- a powered probe drive cylinder secured to said other component of said second slide assembly and having an actuator fluid drivable in the Z-axis direction;
- a Z-axis probe slidably mounted to said probe guide to slide in the Z-axis direction;
- connector means associated with said actuator and said probe;
- the plunger of said first gage being operably associated with the said other component of said first slide assembly to effect a response in said first gage to indicate an X-axis position of said probe;
- the plunger of said second gage being operably associated with the said other component of said second slide assembly to effect a response in said second gage to indicate a Y-axis position of said probe; and
- the plunger of said third gage being operably associated with said actuator to effect a response in said third gage to indicate a Z-axis position of said probe.

2. The gage assembly of claim 1 wherein: said gages are digital electronic indicators.

3. The gage assembly of claim 1 wherein: said gages are substantially identical.

4. The gage assembly of claim 1 wherein: said base has a plurality of mounting holes which have a distribution that is symmetrical with respect to a line parallel to the X-axis, and said slide assemblies are crossed-roller bearing slide assemblies.

5. The gage assembly of claim 1 wherein: said actuator is a piston rod; said connector means is a tie member attached to said piston rod and to said probe, said tie member being engaged by the plunger of said third gage.

6. The gage assembly of claim 1 wherein: said first and second slide assemblies are substantially identical to each other.

7. A gage assembly of claim 1 wherein: the gages are indicators, each having a circular housing with a viewing window therein, the one component of each of said linear slide assemblies having a rectangular mounting surface with a maximum dimension across faces of the rectangle being substantially the same as the diameter of the circle of said indicator housings.

8. A gage assembly to be mounted on a fixture to which workpieces to be measured can be fastened while measurements are made, the assembly comprising:
- a base mountable to the fixture;
- a first gage secured to said base and having a gage-operating member movable along an axis to produce a signal representative of the amount of movement in the direction of said axis;
- a first linear slide assembly having one outer attachment component secured to said base and another outer attachment component anti-friction bearing mounted to said one component thereof for precise, low-friction linear movement of said another component in the direction of said axis;
- said gage operating member being in operative association with said another component of said slide assembly to produce said signal in response to movement of said another component relative to said base in the direction of said axis and caused by force independent of said gage,
- said linear slide assembly component being rectangular,
- the overall length of the longest of said components of said slide assembly being less than 110 millimeters.

9. The assembly of claim 8 and further comprising:
- a second linear slide assembly like said first slide assembly and having first and second outer attachment components relatively moveable on a second axis, said first outer attachment component being secured to the other attachment component of said first slide assembly,
- said second slide assembly being oriented so said second axis is perpendicular to said first axis.

10. The gage assembly of claim 9 and further comprising:
- a gage mount having first and second portions, said first portion being sandwiched between said other component of said first slide assembly and said first component of said second slide assembly; and
- a second gage secured on said second portion of said gage mount and having a gage-operating member movable parallel to said second axis,
- said operating member of said second gage being in operative association with said second attachment component of said second slide assembly to produce a signal in response to movement of said second component relative to said first component in the direction of said second axis.

11. A gage assembly for measuring along two perpendicular axes and comprising:
- first and second anti-friction linear slide assemblies, said first slide assembly having two outer attachment components movable relative to each other along a first axis, said second slide assembly having two outer attachment components movable relative to each other along a second axis, said outer attachment components of each slide assembly having flat and parallel and oppositely facing ends lying in planes perpendicular to said axis of that slide assembly;

a gage and slide mount member attached to one of said outer attachment components of each of said slide assemblies;

said slide assemblies being connected together in stacked relationship with part of said mount member sandwiched between said attachment components to which said mount member is attached, and with the respective axes of said slide assemblies perpendicular to intersecting perpendicular planes; and first and second gages connected to said first and second slide assemblies, respectively, so as to indicate the relative movements of the two outer attachment components along said axes.

12. The gage assembly of claim 11 wherein:

each of said attachment components has two flat, parallel and oppositely facing outer faces perpendicular to said ends, all of said faces lying in parallel planes; and the faces of said attachment components of said slide assemblies are substantially rectangular and have maximum length of less than 110 mm.

13. The gage assembly of claim 11 wherein:

said first and second slide assemblies are substantially identical to each other.

* * * * *